US012281505B2

(12) United States Patent
Numbia

(10) Patent No.: US 12,281,505 B2
(45) Date of Patent: Apr. 22, 2025

(54) SAFETY CHARACTERISTIC INDICATION SYSTEM FOR A DOOR ASSEMBLY AND METHODS OF USING THE SAME

(71) Applicant: Yvonne Numbia, Dacula, GA (US)

(72) Inventor: Yvonne Numbia, Dacula, GA (US)

(73) Assignee: Yvonne Numbia, Dacula, GA (US)

( * ) Notice: Subject to any disclaimer, the term of this patent is extended or adjusted under 35 U.S.C. 154(b) by 0 days.

(21) Appl. No.: 17/960,044

(22) Filed: Oct. 4, 2022

(65) Prior Publication Data

US 2024/0110418 A1 Apr. 4, 2024

(51) Int. Cl.

*E05D 7/00* (2006.01)
*B63C 9/04* (2006.01)
*E05D 3/02* (2006.01)
*E05D 11/00* (2006.01)
*E06B 5/00* (2006.01)

(52) U.S. Cl.

CPC ................ *E05D 11/00* (2013.01); *B63C 9/04* (2013.01); *E05D 3/02* (2013.01); *E06B 5/00* (2013.01); *E05Y 2800/10* (2013.01); *E05Y 2900/132* (2013.01)

(58) Field of Classification Search

CPC ... E05D 11/00; E05D 3/02; B63C 9/04; E06B 5/00; E05Y 2800/10; E05Y 2900/132

USPC .................................................... 16/223, 372

See application file for complete search history.

(56) References Cited

U.S. PATENT DOCUMENTS 2,360,516 A * 10/1944 Schmidling ............... F21V 9/30 252/301.36
2,387,512 A * 10/1945 Hilberg ...................... C09J 7/29 250/462.1
2,797,433 A 7/1957 Hager, Jr.
5,904,017 A * 5/1999 Glatz ........................ F21K 2/00 52/287.1
6,307,207 B1 * 10/2001 Burbank .................. A62B 3/00 250/462.1
6,308,466 B1 * 10/2001 Moriarty .................. E04H 9/14 52/285.3
6,818,177 B1 * 11/2004 Turcotte .................. F24F 8/192 250/435

(Continued)

FOREIGN PATENT DOCUMENTS

CN 108086833 A * 5/2018 ............... E05D 3/02
CN 209444001 U * 9/2019

(Continued)

*Primary Examiner* — Jerry E Redman

(74) *Attorney, Agent, or Firm* — ALSTON & BIRD LLP

(57) ABSTRACT

Various embodiments are directed to apparatuses, methods, and systems for promoting identification of a door being suitable for selective use as a safety device. In various embodiments, a hinge assembly comprises a first hinge plate configured for coupling with a door; a second hinge plate configured for coupling with a wall portion; a hinge pin disposed within a central hinge sleeve defined by an interlocking configuration of one or more first knuckles defined by the first hinge plate and one or more second knuckles defined by the second hinge plate; and one or more door safety characteristic indicator provided at one or more surface of the hinge assembly, the one or more door safety characteristic indicator being configured to provide a perceivable indication that the door is suitable for selective use as a safety device.

14 Claims, 7 Drawing Sheets

(56) References Cited

U.S. PATENT DOCUMENTS

| | | | | | |
|---|---|---|---|---|---|
| 9,687,087 | B1 * | 6/2017 | Artwohl | A47F 11/10 |
| 9,945,173 | B2 * | 4/2018 | Boyer, Jr. | E06B 3/308 |
| 2008/0291539 | A1 * | 11/2008 | Moore | G02B 5/124 359/549 |
| 2009/0211055 | A1 | 8/2009 | Shinall et al. | |
| 2011/0283627 | A1 * | 11/2011 | Shaw | E06B 7/2316 49/478.1 |
| 2019/0292822 | A1 | 9/2019 | Kenerly et al. | |
| 2020/0043389 | A1 * | 2/2020 | Gonchar | G09F 13/16 |

FOREIGN PATENT DOCUMENTS

| | | | | |
|---|---|---|---|---|
| JP | 10269823 A | * | 10/1998 | |
| WO | WO-2009117411 A2 | * | 9/2009 | E05B 17/005 |

* cited by examiner

SAFETY CHARACTERISTIC INDICATION SYSTEM FOR A DOOR ASSEMBLY AND METHODS OF USING THE SAME

FIELD OF THE INVENTION

Various embodiments described herein relate generally to hinge assemblies providing various hardware components configured to facilitate a pivoted attachment of a door relative to a wall.

BACKGROUND

Various applications may require a user to identify whether a door installed within a particular environment is suitable for selective use as a safety device. Applicant has identified many technical challenges and difficulties associated with promoting user identification of a door as being suitable for selective use as a safety device. Through applied effort, ingenuity, and innovation, Applicant has solved problems related to safety characteristic indication systems for door assemblies by developing solutions embodied in the present disclosure, which are described in detail below.

BRIEF SUMMARY

Various embodiments are directed to a hinge assembly for promoting identification of a safety characteristic corresponding to a door, safety characteristic indication systems for a door assembly, and method of using the same. In various embodiments, a hinge assembly for promoting identification of a safety characteristic corresponding to a door may comprise a first hinge plate configured for coupling with a door; a second hinge plate configured for coupling with a wall portion; a hinge pin disposed within a central hinge sleeve defined by an interlocking configuration of one or more first knuckles defined by the first hinge plate and one or more second knuckles defined by the second hinge plate; and one or more door safety characteristic indicator provided at one or more surface of the hinge assembly, the one or more door safety characteristic indicator being configured to provide a perceivable indication that the door is suitable for selective use as a safety device.

In various embodiments, the one or more door safety characteristic indicator may define a visual indicator that promotes an identification of the door as being suitable for use as a flotation device. In various embodiments, the door may be suitable for selective use as a floatation device is based at least in part on one or more safety characteristic corresponding to the door, the one or more safety characteristic corresponding to a door density defined by the door, wherein the door being operable as a flotation device is based at least in part on the door density being below a door density flotation threshold. In various embodiments, the one or more door safety characteristic indicator may comprise a highly visible material element attached to the one or more surface of the hinge assembly. In certain embodiments, at least a portion of the highly visible material element is defined by a reflective material. In certain embodiments, the reflective material is one of reflective lattice material and high-brightness reflective fabric. In certain embodiments, at least a portion of the highly visible material element is defined by an electroluminescence tape.

In various embodiments, the one or more door safety characteristic indicator may comprise a highly visible coating applied to the one or more surface of the hinge assembly. In various embodiments, the one or more door safety characteristic indicator comprises a first door safety characteristic indicator provided at the first hinge plate and a second door safety characteristic indicator provided at the second hinge plate. In various embodiments, the one or more door safety characteristic indicator may comprise a first plurality of door safety characteristic indicator provided at the one or more first knuckles and a second plurality of door safety characteristic indicator provided at the one or more second knuckles. In certain embodiments, the one or more door safety characteristic indicator may further comprise a first planar plate surface indicator provided at a first planar plate defined by the first hinge plate, a second planar plate surface indicator provided at a second planar plate defined by the second hinge plate, and a hinge pin indicator provided at one or more surface of the hinge pin. In various embodiments, the one or more door safety characteristic indicator may be provided at one or more surface of the hinge pin. In various embodiments, the one or more door safety characteristic indicator may comprise at least one textual component defining an instructional message associated with a use of the door enabled by the one or more safety characteristic.

A safety characteristic indication system for a door assembly, the safety characteristic indication system comprising: a door defining a safety characteristic that enables the door to be suitable for selective use as a safety device; at least one door hinge assembly for promoting identification of the safety characteristic corresponding to the door, the hinge assembly comprising: a first hinge plate configured for coupling with the door; a second hinge plate configured for coupling with a wall portion; a hinge pin disposed within a central hinge sleeve defined by an interlocking configuration of one or more first knuckles defined by the first hinge plate and one or more second knuckles defined by the second hinge plate; and one or more door safety characteristic indicator provided at one or more surface of the hinge assembly, the one or more door safety characteristic being configured to provide a perceivable indication of the safety characteristic corresponding to the door.

In various embodiments, the one or more door safety characteristic indicator may define a visual indicator that promotes an identification of the door as being suitable for use as a flotation device. In various embodiments, the door may be suitable for selective use as a floatation device is based at least in part on one or more safety characteristic corresponding to the door, the one or more safety characteristic corresponding to a door density defined by the door. In various embodiments, wherein the door being operable as a flotation device may be based at least in part on the door density being below a door density flotation threshold. wherein the one or more door safety characteristic indicator may comprise a highly visible material element attached to the one or more surface of the hinge assembly. In various embodiments, the one or more door safety characteristic indicator may comprise a highly visible coating applied to the one or more surface of the hinge assembly. In various embodiments, the one or more door safety characteristic indicator may comprise a first door safety characteristic indicator provided at the first hinge plate and a second door safety characteristic indicator provided at the second hinge plate.

BRIEF DESCRIPTION OF THE DRAWINGS

Reference will now be made to the accompanying drawings, which are not necessarily drawn to scale, and wherein.

DETAILED DESCRIPTION

Figure 1:
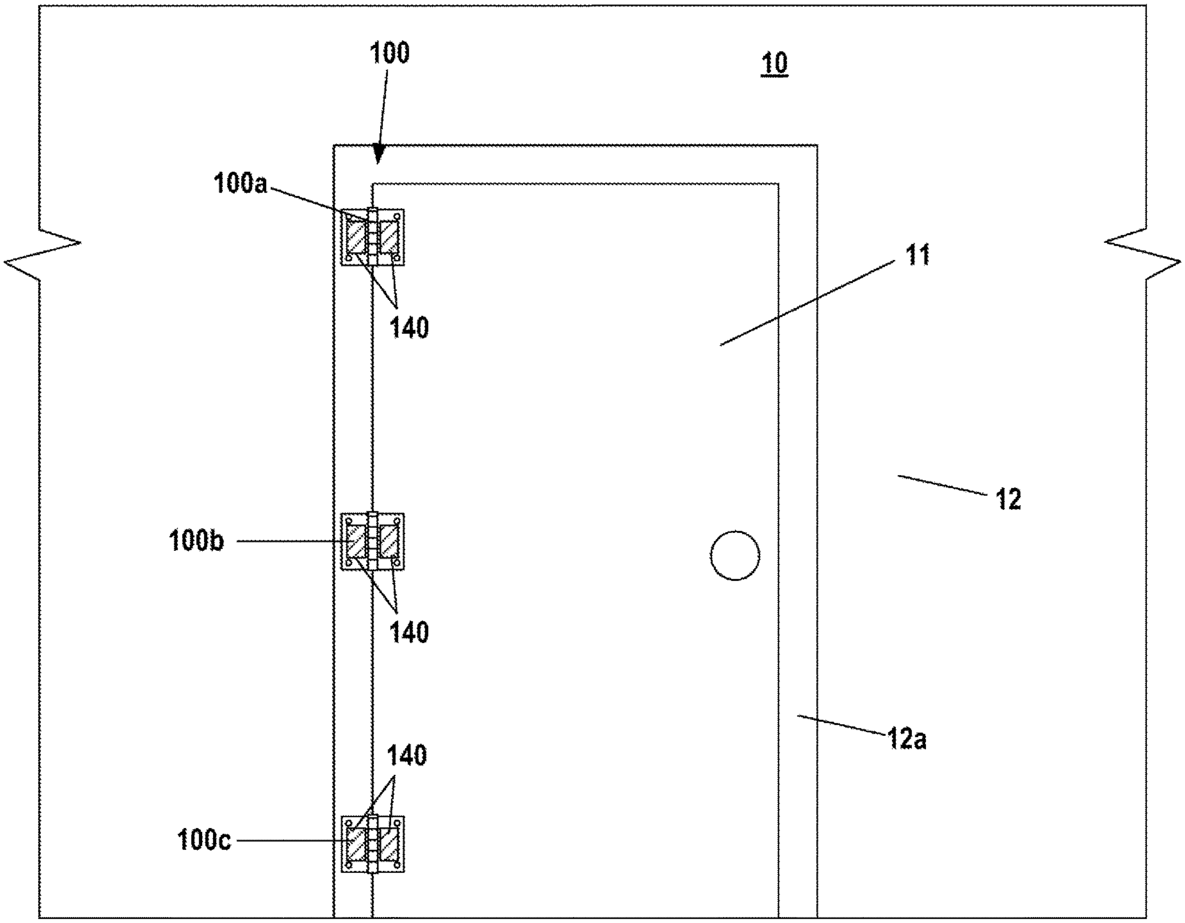
FIG. 1 illustrates an exemplary safety characteristic indication system for a door assembly within an exemplary environment where the system may be used, according to one or more embodiments described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

In various circumstances wherein a person is subjected to a dangerous environmental condition resulting from a natural disaster or any other unforeseen sequence of events, the person may be left with a minimal amount of resources at their disposal that can be used to assist in removing themselves from the dangerous environmental condition. In such instances, persons finding themselves in dangerous conditions, such as, for example, flooding conditions, may be resigned to the use of non-traditional methods of fleeing, escaping, and/or otherwise relocating away from imminent danger. In certain circumstances where a person finds his or herself stranded in a flood zone (e.g., within a building, such as a home) various doors within the flood zone may utilized as a safety device (e.g., a flotation device) that a person may use to avoid falling victim to the dangerous flooding conditions.

Various embodiments described herein are directed to aa hinge assembly for promoting identification of a door as being suitable for selective use as a safety device. For example, in various embodiments, an exemplary hinge assembly may be configured such that, a user may uninstall a door from the installed (e.g., mounted) configuration relative to the hinge assembly, thereby allowing the door to be moved (e.g., linearly) away from the wall to which it was mounted, such as, for example, for relocation and/or independent use thereof. For example, an exemplary hinge assembly may be manipulated by a user to facilitate the removal of a door from an installed configuration relative to a wall portion in order for the door to be used as a flotation device by the user, such as, for example, in various emergency circumstances wherein the user's environment may be defined by a lack of viable ground surfaces upon which the user may safely stand (e.g., circumstances defined by flooding conditions, shipwreck conditions, and/or the like). As described herein, the present invention includes an exemplary safety characteristic indication system that utilizes a hinge assembly comprising one or more door safety characteristic indicator to promote identification of the door associated with the hinge assembly as being suitable for selective use as a safety device by providing a perceivable indication to the user that the door is suitable for such use. The present invention is configured to function as a proactive means of alerting the user to the safety characteristic defined by the door, thus minimizing the time, effort, and uncertainty associated with a user in a dangerous environmental condition attempting to uninstall a door that is not capable of remaining afloat long enough to effectively function as a floating device for the user.

FIG. 1 illustrates an exemplary safety characteristic indication system for a door assembly within an exemplary environment where the system may be used, according to one or more embodiments described herein. As illustrated, an exemplary safety characteristic indication system 10 may comprise at least one door 11 and at least one door hinge assembly 100 configured for coupling with both a side edge of the door 10 and a wall portion 12 (e.g., a door frame 12*a*) to facilitate a pivoted attachment of the door 11 relative to the wall portion 12 about a hinge axis defined by the at least one door hinge assembly 100.

In various embodiments, an exemplary hinge assembly 100 may be configured for attachment to each of the door 11 and the wall portion 12 via respective fastening means to facilitate a rotation of the door 11 relative to the stationary wall portion 12 about a fixed axis of rotation defined by the hinge assembly 100 (e.g., between a closed position and a fully-open position). In various embodiments, as described in further detail herein, an exemplary hinge assembly may comprise two hinge plates configured for respective attachment to one of the door 11 and the wall portion 12, the two hinge plates defining respective knuckles configured to be arranged in an interlocking configuration so as to define a hinge sleeve within which a hinge pin may be provided. As further described herein, the hinge pin may be provided within the hinge sleeve to secure the positioning of the two hinge plates relative to one another such that the door 11 is provided in an installed configuration relative to the wall portion 12 (e.g., the door frame 12*a*).

In various embodiments, an exemplary safety characteristic indication system 10 may include a door 11 that may be selectively uninstalled relative to the wall portion 12 from the installed configuration illustrated in FIG. 1 to an uninstalled configuration wherein the door 11 is entirely detached from the wall portion 12 based on a selective user interaction (e.g., disassembly, manipulation, and/or the like) with the at least one hinge assembly 100. For example, in various embodiments, an exemplary hinge assembly 100 may be configured such that, a user may uninstall the door 11 from the installed (e.g., mounted) configuration by removing the respective hinge pins of each of the one or more hinge assemblies 100 from within the hinge sleeves defined by the two hinge plates of each hinge assembly 100, thereby allowing the door 11 (e.g., and the respective hinge plates engaged therewith) to be moved (e.g., linearly) away from the wall portion 12, such as, for example, for relocation and/or independent use thereof. As a non-limiting example, an exemplary hinge assembly 100 may be manipulated by a user to facilitate the removal of a door 11 from an installed configuration relative to a wall portion 12 in order for the door 11 to be used as a flotation device by the user, such as, for example, in various emergency circumstances wherein the user's environment may be defined by a lack of viable ground surfaces upon which the user may safely stand (e.g., circumstances defined by flooding conditions, shipwreck conditions, and/or the like). In various embodiments, as described herein, the exemplary safety characteristic indication system 10 may utilize one or more door safety characteristic indicator 140 defined at the one or more hinge assembly 100 to provide a perceivable indication to a user that the door 11 is suitable for use as a flotation device, thereby proactively alerting the user to the safety characteristic defined by the door 11 and minimizing the time, effort, and uncertainty associated with a user attempting to uninstall a door that is not capable of remaining afloat long enough to effectively function as a floating device for the user.

As described herein, an exemplary door 11 of a safety characteristic indication system 10 may define one or more safety characteristics that may enable the door 11 to be suitable for selective use as a safety device upon detachment from wall portion 12. For example, the one or more safety characteristics corresponding to the door 11 may be defined by various attributes of the door 11, such as, for example, one or more physical attributes, materials properties, and/or the like. As a non-limiting example, the one or more safety characteristics corresponding to the door 11 may comprise a door density defined by the door 11. For example, in various embodiments, an exemplary door 11 may have a sufficiently low density such that the door 11, in an uninstalled configuration relative to the wall portion 12, has a buoyancy sufficient to enable the door 11 to float on water and function as a flotation device (e.g., a boat, a raft, a buoy, and/or the like) for a user positioned provided on an upward-facing surface of the floating door 11. A door 11 may define a safety characteristic of a door density corresponding to the door 11 being suitable for use as a flotation device based at least in part on the door density being below a door density flotation threshold such that the door density is defined by a density value that sufficiently low such that the door may float atop a body of water.

In various embodiments, the one or more hinge assembly 100 configured for attachment to each of the door 11 and the wall portion 12 such that the door 11 is pivotably mounted relative to the wall portion 12 may be further configured for promoting identification of a safety characteristic corresponding to the door 11. For example, in various embodiments, as described herein, an exemplary hinge assembly 100 of a safety characteristic indication system 10 may comprise one or more door safety characteristic indicators 140 configured to provide a perceivable indication of that the door is suitable for selective use as a safety device. For example, the illustrated safety characteristic indication system 10 includes a door 11 defining a safety characteristic (e.g., a door density) that enables the door to be suitable for selective use as a safety device, and one or more hinge assemblies 100 comprising respective indicators 140 configured for providing a perceivable (e.g., visual) indication that the door 11 is suitable for selective use as a safety device (e.g., a floating device) based at least in part on the safety characteristic defined by the door 11 (e.g., the door density).

Figure 2A:
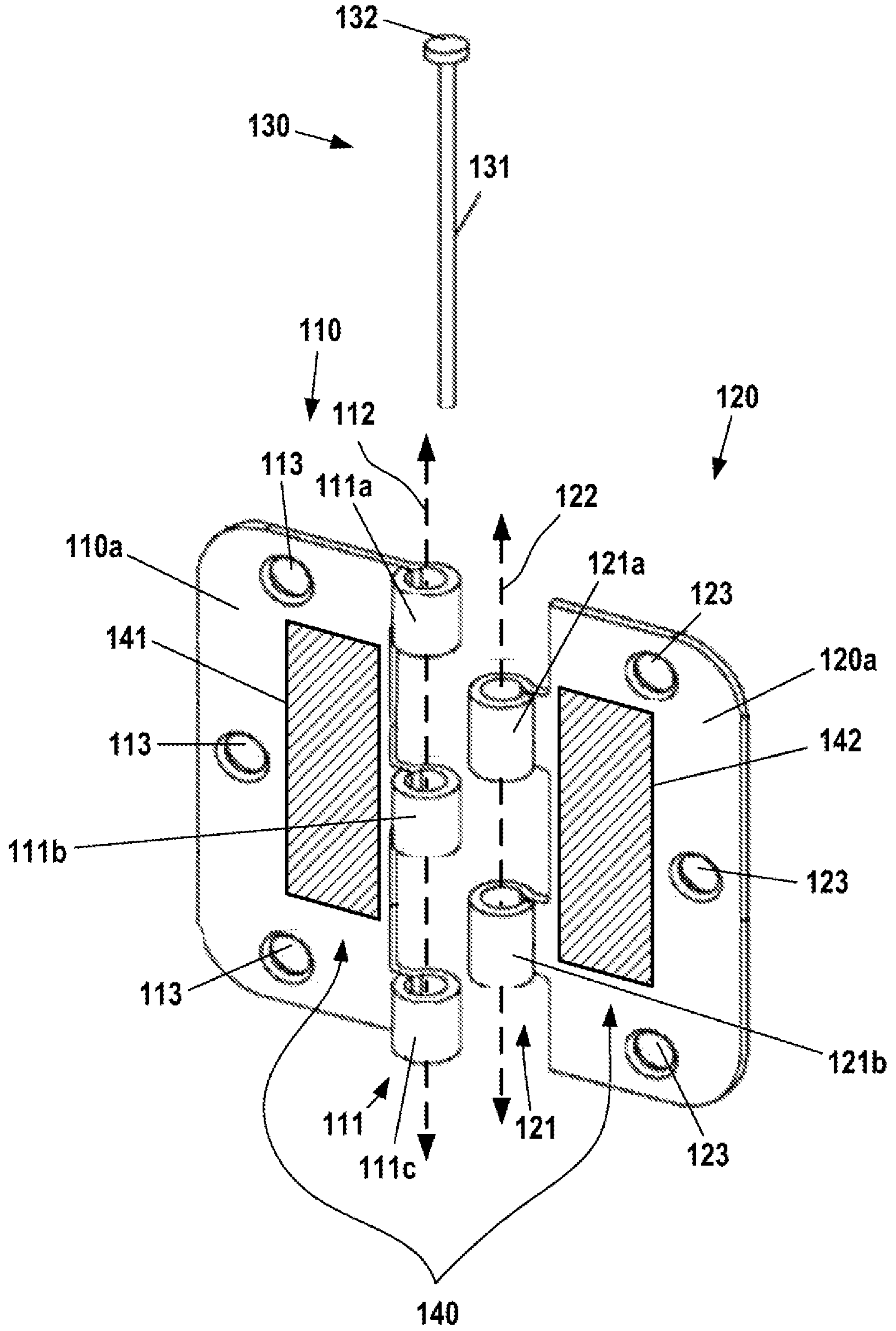
FIGS. 2A and 2B illustrate an exploded view and a perspective view of an exemplary hinge assembly for promoting identification of a safety characteristic corresponding to a door according to various exemplary embodiments described herein.
Figure 2B:
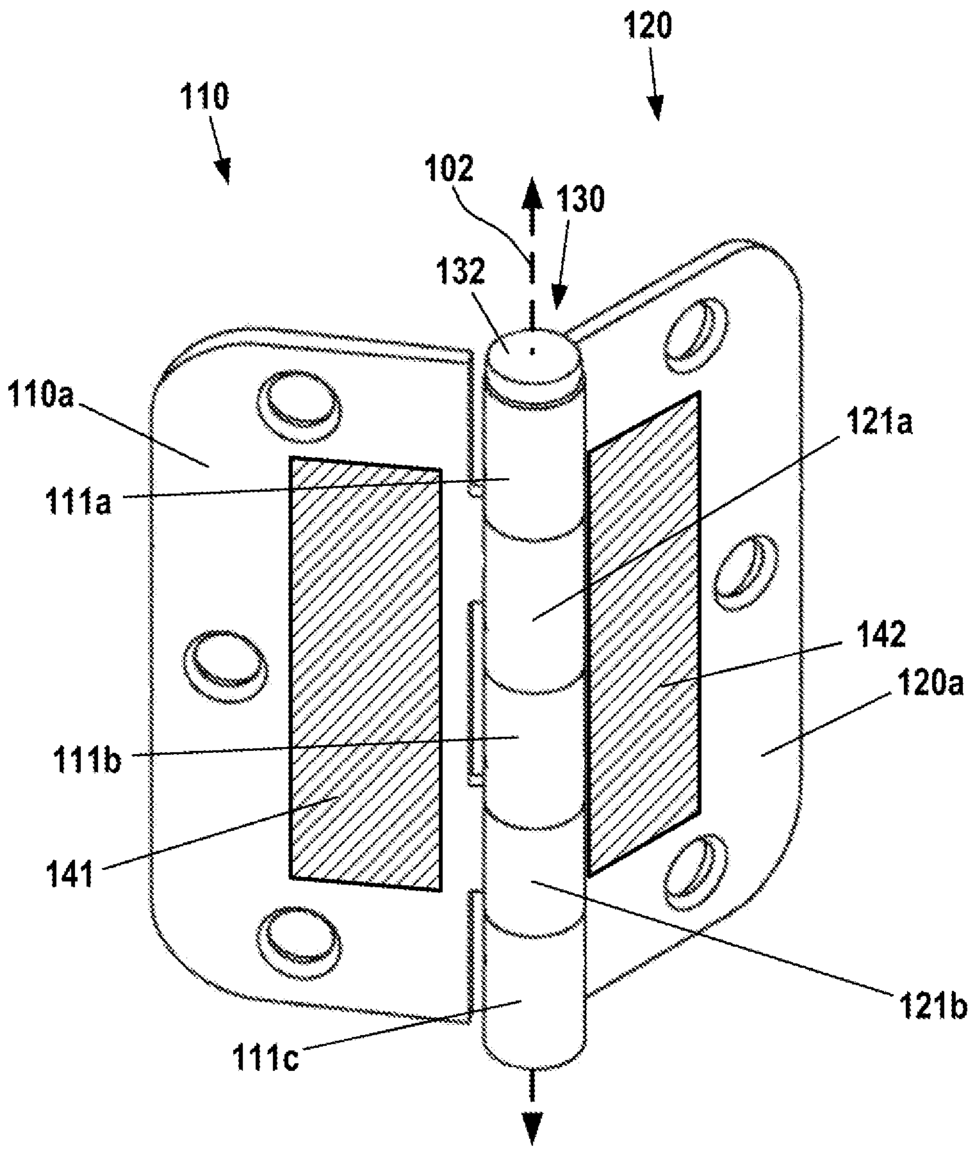

FIGS. 2A and 2B illustrate various views of an exemplary hinge assembly for promoting identification of a safety characteristic corresponding to a door according to various exemplary embodiments described herein. In particular, FIG. 2A and FIG. 2B illustrate an exploded view and a perspective view, respectively, of an exemplary hinge assembly for promoting identification of a safety characteristic corresponding to a door according to various exemplary embodiments described herein.

As illustrated, in various embodiments, an exemplary hinge assembly 100 may comprise a first hinge plate 110 configured for coupling with a door, a second hinge plate 120 configured for coupling with a wall portion, a hinge pin 130 and one or more door safety characteristic indicator 140 provided at one or more surface of the hinge assembly 100 and configured to provide a perceivable indication that the door is suitable for selective use as a safety device.

In various embodiments, an exemplary hinge apparatus 100 may comprise a first hinge plate 110 configured to be fixedly secured to a door so as to define the position of the hinge assembly 100 relative to the door. As illustrated, in various embodiments, the first hinge plate 110 may comprise an at least substantially planar rigid component defining a first planar portion 110*a* having at least one fastening aperture 113 that extends through the thickness of a first planar portion 110*a* and is configured to receive and/or at least partially secure a fastening means therein to facilitate the attachment of the first hinge plate 110 to the door. As non-limiting examples, in various embodiments, the first hinge plate 110 may be configured for coupling to the door by a first fastening means comprising a bolt, a pin, a latch, a hook, and/or any other suitable mechanical fastening means configured to engage both the first planar portion 110*a* of the first hinge plate 110 and the door to secure the first hinge plate 110 relative to the wall portion. In various embodiments, the first planar portion 110*a* of the first hinge plate 110 may be defined at least in part by a first outward-facing hinge plate surface configured to face in an at least outward direction away from the door surface upon the first hinge plate 110 being secured to the door. As described in further detail herein, in various embodiments, one or more door safety characteristic indicators 140 may be provided at the first outward-facing hinge plate surface defined by the first planar portion 110*a* of the first hinge plate 110.

Further, in various embodiments, an exemplary hinge apparatus 100 may comprise a second hinge plate 120 configured to be fixedly secured to a wall portion, such as, for example, a door frame, so as to define the position of the hinge assembly 100 relative to the wall portion. As illustrated, in various embodiments, the second hinge plate 120 may comprise an at least substantially planar rigid component defining a second planar portion 120*a* having at least one fastening aperture 123 that extends through the thickness of a second planar portion 120*a* and is configured to receive and/or at least partially secure a fastening means therein to facilitate the attachment of the second hinge plate 120 to the wall portion. As non-limiting examples, in various embodiments, the second hinge plate 120 may be configured for coupling to the wall portion by a second fastening means comprising a bolt, a pin, a latch, a hook, and/or any other suitable mechanical fastening means configured to engage both the second planar portion 120*a* of the second hinge plate 120 and the wall portion to secure the second hinge plate 120 relative to the wall portion. In various embodiments, the second planar portion 120*a* of the second hinge plate 120 may be defined at least in part by a second outward-facing hinge plate surface configured to face in an at least outward direction away from the wall portion surface upon the second hinge plate 120 being secured to the wall portion. As described in further detail herein, in various embodiments, one or more door safety characteristic indicators 140 may be provided at the second outward-facing hinge plate surface defined by the second planar portion 120*a* of the second hinge plate 120.

In various embodiments, the first hinge plate 110 of an exemplary hinge assembly 100 defines one or more first knuckle 111 that each defines an at least substantially tubular component defining a hollow interior portion along a central axis thereof. The one or more first knuckle 111 may be rigidly connected to the first planar portion 110*a* of the first hinge plate 110. In various embodiments, as illustrated, an exemplary first hinge plate 110 may define a plurality of first knuckles 111, including three first knuckles 111*a*, 111*b*, and 111*c*. In such an exemplary configuration, each of the plurality of first knuckles 111 may be coaxially arranged along the respective central axes so as to define a non-continuous cylindrical channel along a first axis 112 within which the first hinge plate 110 is configured to receive the hinge pin 130, as described herein.

In various embodiments, the second hinge plate 120 of an exemplary hinge assembly 100 defines one or more second knuckle 121 that each defines an at least substantially tubular component defining a hollow interior portion along a central axis thereof. The one or more second knuckle 121 may be rigidly connected to the second planar portion 120*a* of the second hinge plate 120. In various embodiments, as illustrated, an exemplary second hinge plate 120 may define a plurality of second knuckles 121, including two second knuckles 121*a* and 121*b*. In such an exemplary configuration, each of the plurality of second knuckles 121 may be coaxially arranged along the respective central axes so as to define a non-continuous cylindrical channel along a second axis 122 within which the second hinge plate 120 is configured to receive the hinge pin 130, as described herein.

In various embodiments, the one or more first knuckles 111 and the one or more second knuckles 121 defined by the first hinge plate 110 and the second hinge plate 120, respectively, may be configured to engage one another to define an interlocking configuration of the first and second hinge plates 110, 120 (e.g., of the first knuckles 111 and the second knuckles 121). For example, the first knuckles 111 and the second knuckles 121 may be arranged in an at least substantially aligned configuration relative to one another such that the first axis 112 defined by the first knuckles 111 is coaxial to the second axis 122 defined by the second knuckles 121. In such an exemplary configuration, the respective non-continuous channels defined by the coaxially arranged first and second knuckles 111, 121 may be aligned such that the first and second knuckles 111, 121 collectively define a central hinge sleeve embodying an at least substantially continuous cylindrical channel along a hinge axis 102 (e.g., corresponding to the coaxial first axis 112 and the second axis 122) within which the hinge assembly 100 (e.g., both the first and second hinge plates 110, 120) is configured to receive a hinge pin 130.

In various embodiments, the hinge assembly 100 may comprise a hinge pin 130 disposed at least partially within the central hinge sleeve defined by the interlocking configuration of the first and second hinge plates 110, 120 (e.g., the first and second knuckles 111, 121) to define a pivotable configuration between first and second hinge plates 110, 120. For example, the hinge pin 130 being disposed within the central hinge sleeve may prevent the first and second hinge plates 110, 120 from moving linearly relative to one another, while the first hinge plate 110 to rotate relative to the second hinge plate about the hinge axis 102. In various embodiments, the hinge pin may comprise a pin body 131 embodying a cylindrical rod element having a length defined along a central hinge pin axis that is defined by a central axis of the cylindrical rod element.

The hinge pin 130 may further include a pin head 132 provided at an end (e.g., an upper end) of the pin body 131, the pin head 132 having a material thickness defined between a bottom pin head surface that is engaged with the end of the pin body 131 and an opposing top pin head surface facing in a direction away from the pin body 131, with one or more pin head sidewall surfaces being defined therebetween.

As illustrated in FIG. 2B, the pin body 131 of the hinge pin 130 may be provided within the central hinge sleeve such that the pin body is engaged with each of the first knuckles 111*a*, 111*b*, 111*c* defined by the first hinge plate 110 and each of the second knuckles 121*a* and 121*b* defined by the second hinge plate 120. The arrangement of the hinge pin 130 relative to the first hinge plate 110 and the second hinge plate 120 may define the pivotable configuration between first and second hinge plates 110, 120 about the hinge axis 102 to move (e.g., rotate) a door coupled to the hinge assembly 100 between a closed position and a fully opened position. For example, the hinge assembly 100 may be configured such that, upon the hinge pin 130 (e.g., the pin body) being disposed within the central hinge sleeve, the central hinge pin axis defined by the hinge pin 130 is coaxial to both the first axis and the second axis defined by the first knuckles 111 and the second knuckles, respectively (e.g., the hinge axis 102).

In various embodiments, as illustrated in FIGS. 2A and 2B, an exemplary hinge assembly 100 may comprise one or more door safety characteristic indicator provided at one or more surface of the hinge assembly 100 to provide a perceivable indication that a door to which the hinge assembly 100 is configured to be attached is suitable for selective use as a safety device. For example, in an illustrative embodiments wherein an exemplary hinge assembly 100 (e.g., a first hinge plate 110) is configured for coupling with a door defining a safety characteristic, such as, for example, a door density, that enables the door to be suitable for selective use as a safety device, the exemplary hinge assembly 100 may comprise one or more door safety characteristic indicators 140 configured for promoting user identification of the door attached to the hinge assembly 100 as being suitable for use as a safety device by providing a perceivable (e.g., visual) indication configured to, upon being perceived by a user, cause the user to recognize that the door has utility in functioning as a safety device. As a non-limiting example, in various embodiments, the one or more door safety characteristic indicators 140 may provide a visually perceivable indication to a user that the door attached to the hinge assembly 100 may be used as a flotation device (e.g., upon uninstallation from the wall portion) based at least in part on the door density of the door being sufficiently low to correspond to a buoyancy that enables the door to maintain a floating condition on a body of water while supporting the weight of a user thereon (e.g., within a generally accepted weight range). In an exemplary safety characteristic indication system (e.g., the exemplary safety characteristic indication system 10 illustrated in FIG. 1) comprise at least one first door defining a safety characteristic that enables the at least one first door to be suitable for selective use as a safety device, and at least one second door defining a corresponding safety characteristic causes the at least one second doors to be rendered inoperable as a safety device, the exemplary safety characteristic indication system may be configured such that at least one hinge assembly 100 comprising a door safety characteristic indicator 140 is used to mount each of the at least one first doors relative to the respective wall portions, while hinge assemblies used to mount the at least one second doors does not include a door safety characteristic indicator 140.

In various embodiments, a door safety characteristic indicator 140 may comprise a highly visible material element attached to the one or more surface of the hinge assembly 100. In various embodiments, the highly visible material element of the door safety characteristic indicator 140 may be defined by a material element physically distinct from the hinge plates 110, 120 of the hinge assembly 100 that is adhered, fastened, and/or otherwise attached relative to one or more surfaces of the hinge assembly 100 that may be visible to a user (e.g., at the planar plate portions, the knuckles, and/or the hinge pin). For example, in various embodiments, the highly visible material element of the door safety characteristic indicator 140 may comprise a material element (e.g., a distinct piece of material configured as a strip or any other shape appropriate for application relative to a surface of the hinge assembly 100) defining a visually distinguishable portion configured to be visually distinguished from the one or more surfaces of the hinge assembly to facilitate a visual detection of the door safety characteristic indicator 140 by a user. As non-limiting examples, various visually distinguishable portions may comprise a distinct color, texture, material, pattern, and/or any other distinguishing feature that may be visually detected by a user to promote user identification of the hinge assembly 100 as being associated with a door that is suitable for selective use as a safety device.

Further, in various embodiments, at least a portion of the highly visible material element defining a door safety characteristic indicator 140 may be defined by a reflective material. For example, a door safety characteristic indicator 140 provided at one or more visible surfaces of the hinge assembly 100 may be configured such that, upon a light (e.g., from a flashlight) being shined on the at least a portion of the highly visible material element defined by the reflective material, the visibility and/or the brightness of the highly visible material element as perceived by the user may be increased relative to the other non-reflective surfaces of the hinge assembly 100. As a non-limiting example provided for illustrative purposes, in various embodiments, a highly visible material element of an exemplary door safety characteristic indicator 140 may be defined at least in part by a reflective material comprising, a reflective lattice material, a high-brightness reflective fabric, and/or the like. Further, as an additional non-limiting example provided for illustrative purposes, in various embodiments, a highly visible material element of an exemplary door safety characteristic indicator 140 may be defined at least in part by an electroluminescence component, such as, for example, an electroluminescence wire, an electroluminescence tape, and/or the like.

In various embodiments, an exemplary door safety characteristic indicator 140 may embody a portion of one or more of the first hinge plate 110 and the second hinge plate 120 that is configured to be revealed, become visible, and/or otherwise become more visible to a user upon a light beam being shined on a visible surface of the high visibility material element. For example, door safety characteristic indicator 140 having such an exemplary configuration, wherein the high visibility material element defining the door safety characteristic indicator 140 may be revealed, become visible, and/or otherwise become highly visible to a user upon the user shining a light beam thereon. The highly visible material element defining the door safety characteristic indicator 140 may function as a visual indicator that, upon being perceived by the user, may cause the user to identify the hinge assembly 100 at which the door safety characteristic indicator 140 is provided as being associated with (e.g., used for mounting) a door that is suitable for selective use as a safety device, as described herein.

In various embodiments, a door safety characteristic indicator 140 may comprise a highly visible coating applied to the one or more surface of the hinge assembly 100. For example, a door safety characteristic indicator 140 that comprises a highly visible coating may be defined by a material coating that is applied to one or more surfaces of the hinge assembly 100 that may be visible to a user (e.g., at the planar plate portions, the knuckles, and/or the hinge pin). For example, in various embodiments, the highly visible material coating that defines the door safety characteristic indicator 140 may comprise a coating applied to a portion of the visible surface area of the defined by a hinge assembly 100 to define a visually distinguishable portion configured to be visually distinguished from the uncoated surfaces of the hinge assembly 100 to facilitate a visual detection of the door safety characteristic indicator 140 by a user. As non-limiting examples, the coated surface area defining the visually distinguishable portion(s) may comprise a distinct color, texture, material, pattern, and/or any other distinguishing feature that may be visually detected by a user to promote user identification of the hinge assembly 100 as being associated with a door that is suitable for selective use as a safety device.

As described above, in various embodiments, the highly visible material coating may be defined at least in part by a reflective coating. For example, a door safety characteristic indicator 140 defined by a coated surface area of the hinge assembly 100 that is coated with a reflective coating may be configured such that, upon a light (e.g., from a flashlight) being shined thereon, the visibility and/or the brightness of the highly visible material coating, as perceived by the user, may be increased relative to the other non-reflective surfaces of the hinge assembly 100.

In various embodiments, an exemplary door safety characteristic indicator 140 may embody a portion of one or more of the first hinge plate 110 and the second hinge plate 120 that is configured to be revealed, become visible, and/or otherwise become more visible to a user upon a light beam being shined on a visible surface of the high visibility material coating. For example, in such an exemplary configuration, wherein the door safety characteristic indicator 140 is defined by a surface area of the hinge assembly 100 that is coated with a high visibility material coating, the high visibility material coating (e.g., the door safety characteristic indicator 140) may be revealed, become visible, and/or otherwise become highly visible to a user upon the user shining a light beam thereon. The highly visible material coating defining the door safety characteristic indicator 140 may function as a visual indicator that, upon being perceived by the user, may cause the user to identify the hinge assembly 100 at which the door safety characteristic indicator 140 is provided as being associated with (e.g., used for mounting) a door that is suitable for selective use as a safety device, as described herein.

In various embodiments, one or more door safety characteristic indicator 140 of an exemplary hinge assembly 100 may be provided on one or more surfaces of the hinge assembly 100 defined by the first planar plate portion 110*a*, the second planar plate portion 120*a*, the first knuckles 111, the second knuckles 121, the hinge pin 130, any combination thereof, and/or any other surface defined by the hinge assembly 100 that may be visible to a user in a configuration wherein a door is coupled to the first hinge plate 110. For example, as illustrated in FIGS. 2A and 2B, the door safety characteristic indicator 140 may be provided on one or more of the first and second planar plate portions 110*a*, 120*a*. In particular, the one or more door safety characteristic indicator 140 may comprise a plurality of door safety characteristic indicators including a first door safety characteristic indicator 141 provided at the first planar plate portion 110*a* of the first hinge plate 110, and a second door safety characteristic indicator 142 provided at the second planar plate portion 120*a* of the second hinge plate 120. As illustrated, the first door safety characteristic indicator 141 may be provided over a first portion of the surface area of a first outward-facing hinge plate surface of the first planar plate portion 110*a* such that the first portion of the surface area is visually distinguishable from a second portion of the first outward-facing hinge plate surface. Such a visually distinguishable configuration may promote the user perception of the first door safety characteristic indicator 141, and, further, the recognition of the first door safety characteristic indicator 141 as an indication that the door associated with the hinge assembly 100 is suitable for selective use as a safety device. Further, as illustrated, the second door safety characteristic indicator 142 may be provided over a first portion of the surface area of a second outward-facing hinge plate surface of the second planar plate portion 120*a* such that the first portion of the surface area is visually distinguishable from a second portion of the second outward-facing hinge plate surface. Such a visually distinguishable configuration may promote the user perception of the second door safety characteristic indicator 142, and, further, the recognition of the second door safety characteristic indicator 142 as an indication that the door associated with the hinge assembly 100 is suitable for selective use as a safety device.

In various embodiments, a door safety characteristic indicator 140 may comprises at least one textual component defining an instructional message associated with the use of a door associated with the hinge assembly 100 as a safety device. Further, in various embodiments, the portion of the surface area of the hinged assembly 100 (e.g., an outward-facing hinge plate surface) may be defined by an indicator shape that may correspond to a symbol relating at least in part to the instructional message defined by the door safety characteristic indicator 140 and/or a specific utility of the door with the hinge assembly 100. For example, in various embodiments wherein a hinge assembly 100 is mounted to a door that is suitable for selective use as a flotation device, the door safety characteristic indicator 140 may be configured to define an indicator shape that is at least partially wave-shaped. For example, the door safety characteristic indicator 140 may be provided along a wave-shaped portion of the surface of the hinge assembly 100 to provide a perceivable indication that the door associated with the hinge assembly 100 is suitable for selective use as a flotation device.

Figure 3A:
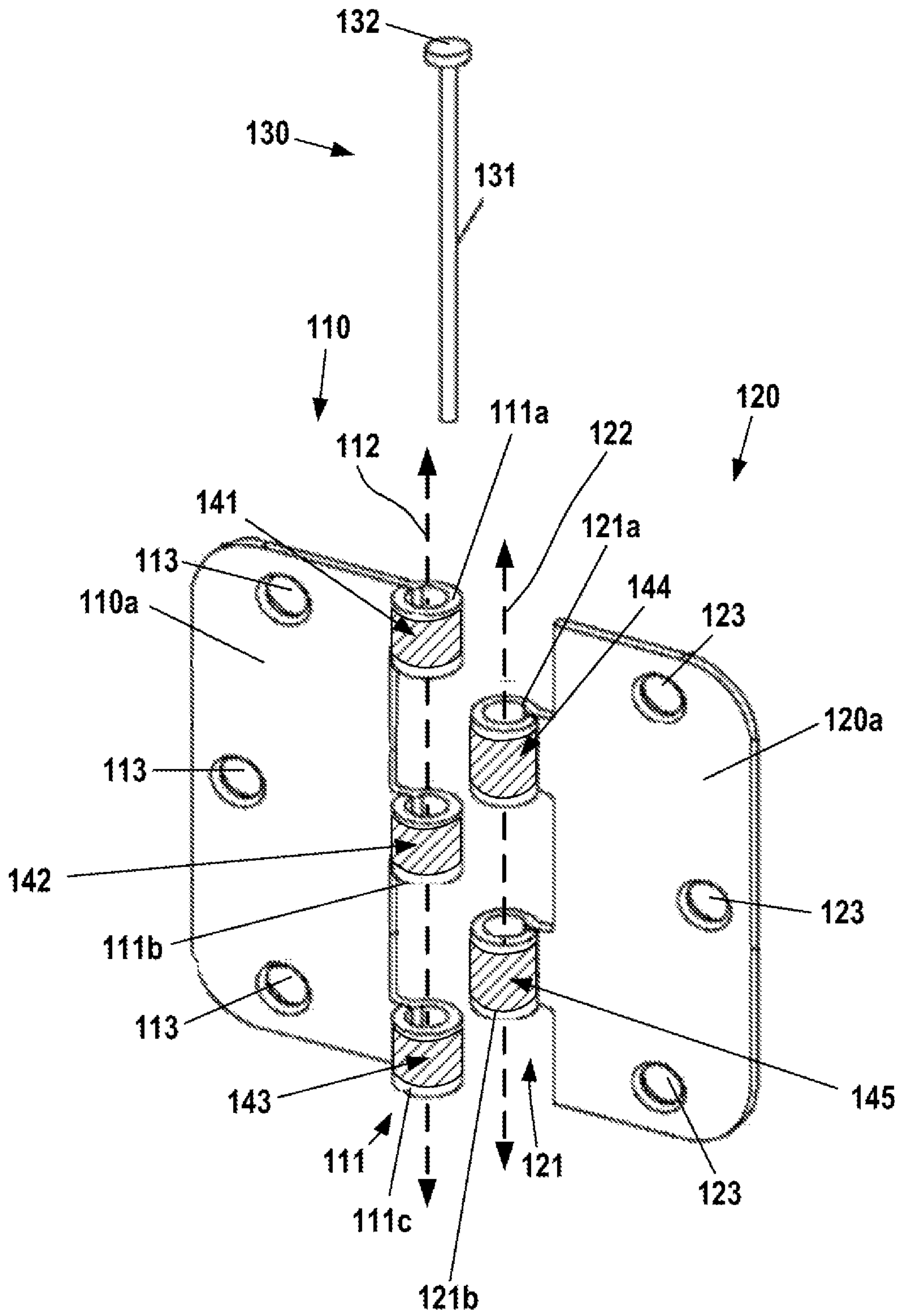
FIGS. 3A and 3B illustrate an exploded view and a perspective view of an exemplary hinge assembly for promoting identification of a safety characteristic corresponding to a door according to various exemplary embodiments described herein.
Figure 3B:
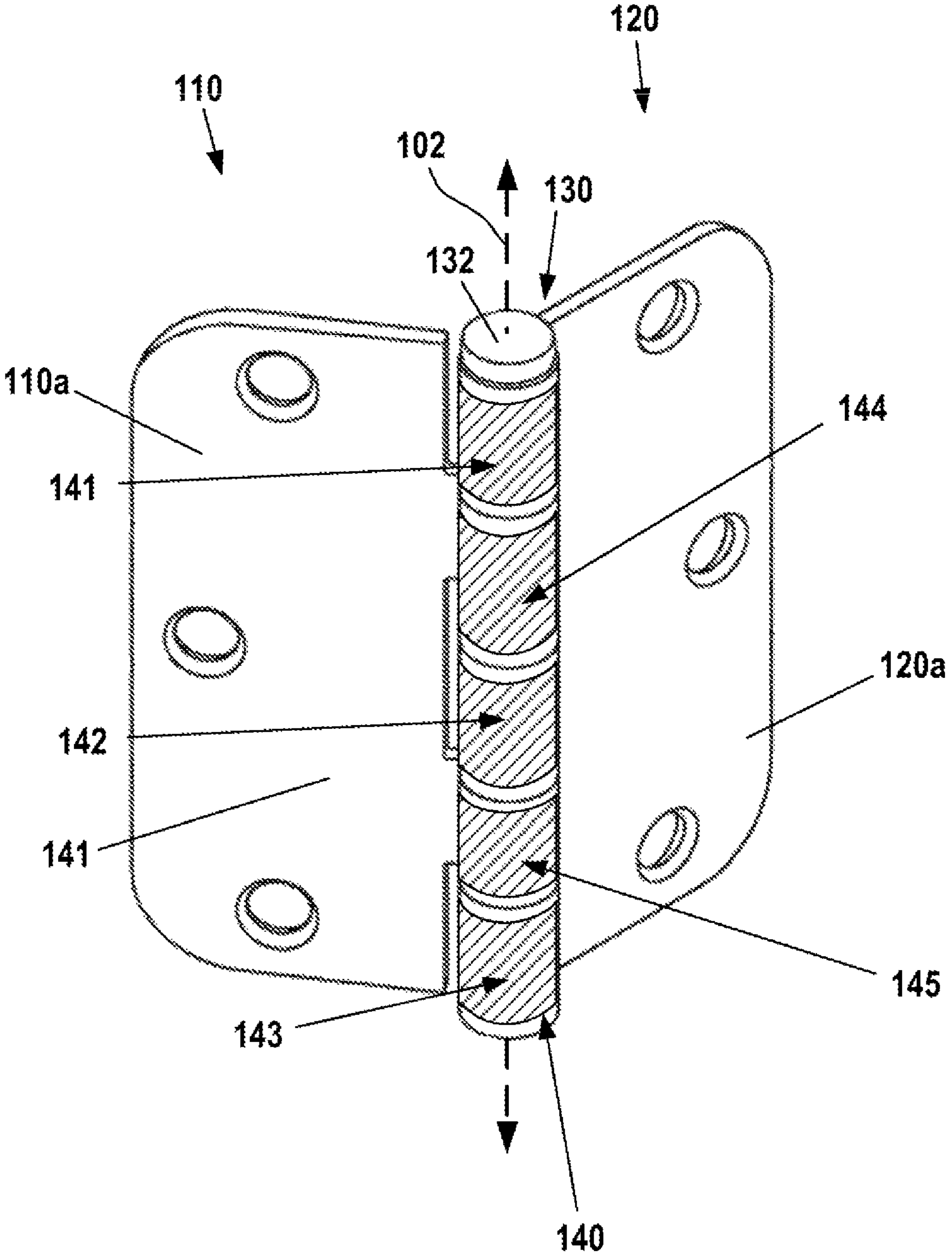

In various embodiments, an exemplary hinge assembly 100 may comprise a door safety characteristic indicator 140 provided on a visible external surface of one or more of the first knuckles 111 defined by the first hinge plate 110 and the second knuckles 121 defined by the second hinge plate 120. In particular, as illustrated in FIGS. 3A and 3B, the one or more door safety characteristic indicator 140 of an exemplary hinge assembly 100 may comprise a plurality of door safety characteristic indicators including a first door safety characteristic indicator 141, a second door safety characteristic indicator 142, and a third door safety characteristic indicator 143 provided at each of the three first knuckles 111*a*, 111*b*, 111*c* defined by the first hinge plate 110, respectively, and, further, a fourth door safety characteristic indicator 144 and a fifth door safety characteristic indicator 145 provided at each of the two second knuckles 121*a*, 121*b* defined by the second hinge plate 120, respectively. In such an exemplary configuration wherein a respective door safety characteristic indicator of the plurality 140 is provided at each of the first knuckles 111 and second knuckles 121 defining the interlocking configuration, as described herein, the plurality of door safety characteristic indicators 140 may be arranged in a stacked configuration relative to one another so as to collectively define an at least substantially continuous door safety characteristic indicator portion provided along a length of the central hinge sleeve.

Figure 4A:
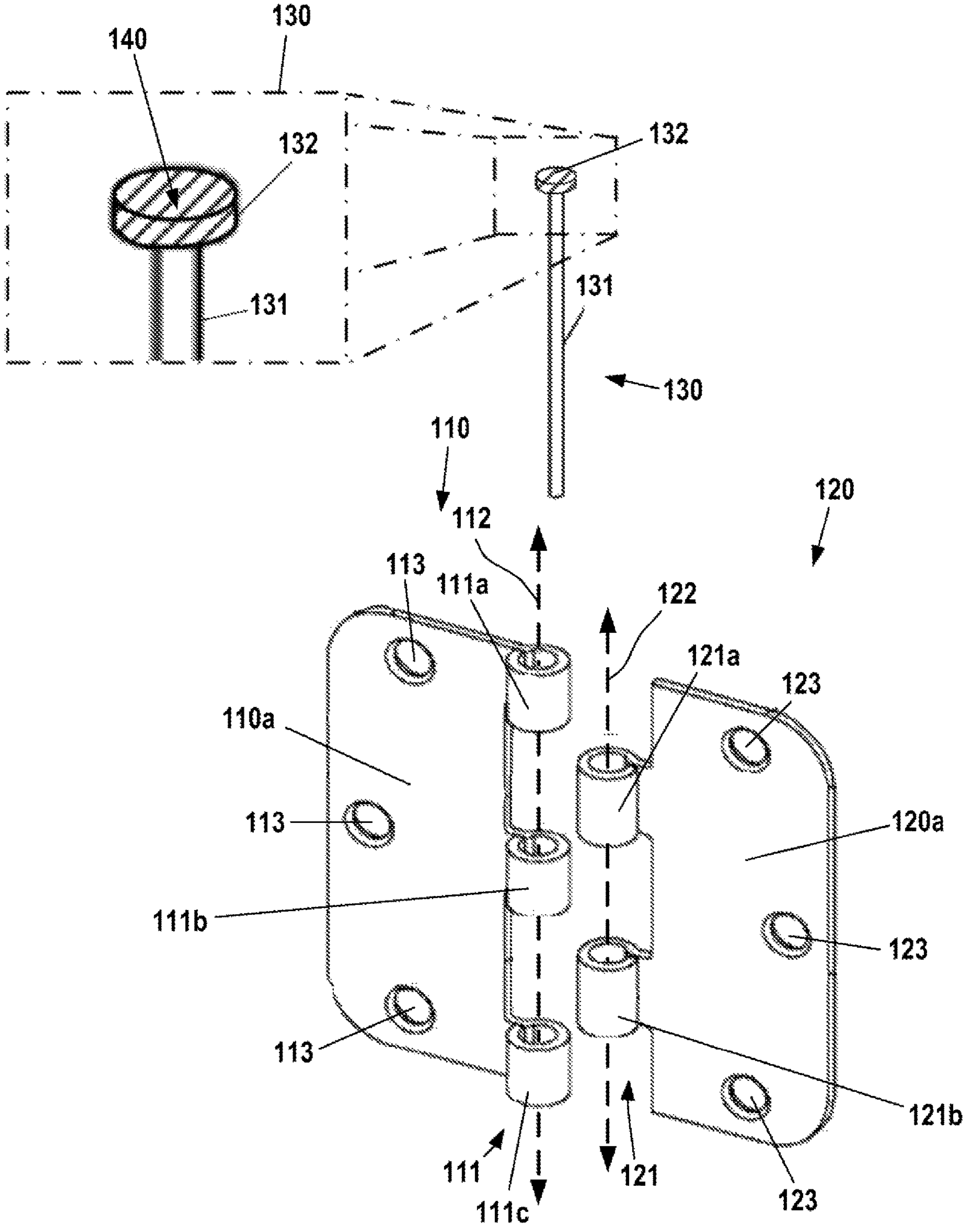
FIGS. 4A and 4B illustrate an exploded view and a perspective view of an exemplary hinge assembly for promoting identification of a safety characteristic corresponding to a door according to various exemplary embodiments described herein.
Figure 4B:
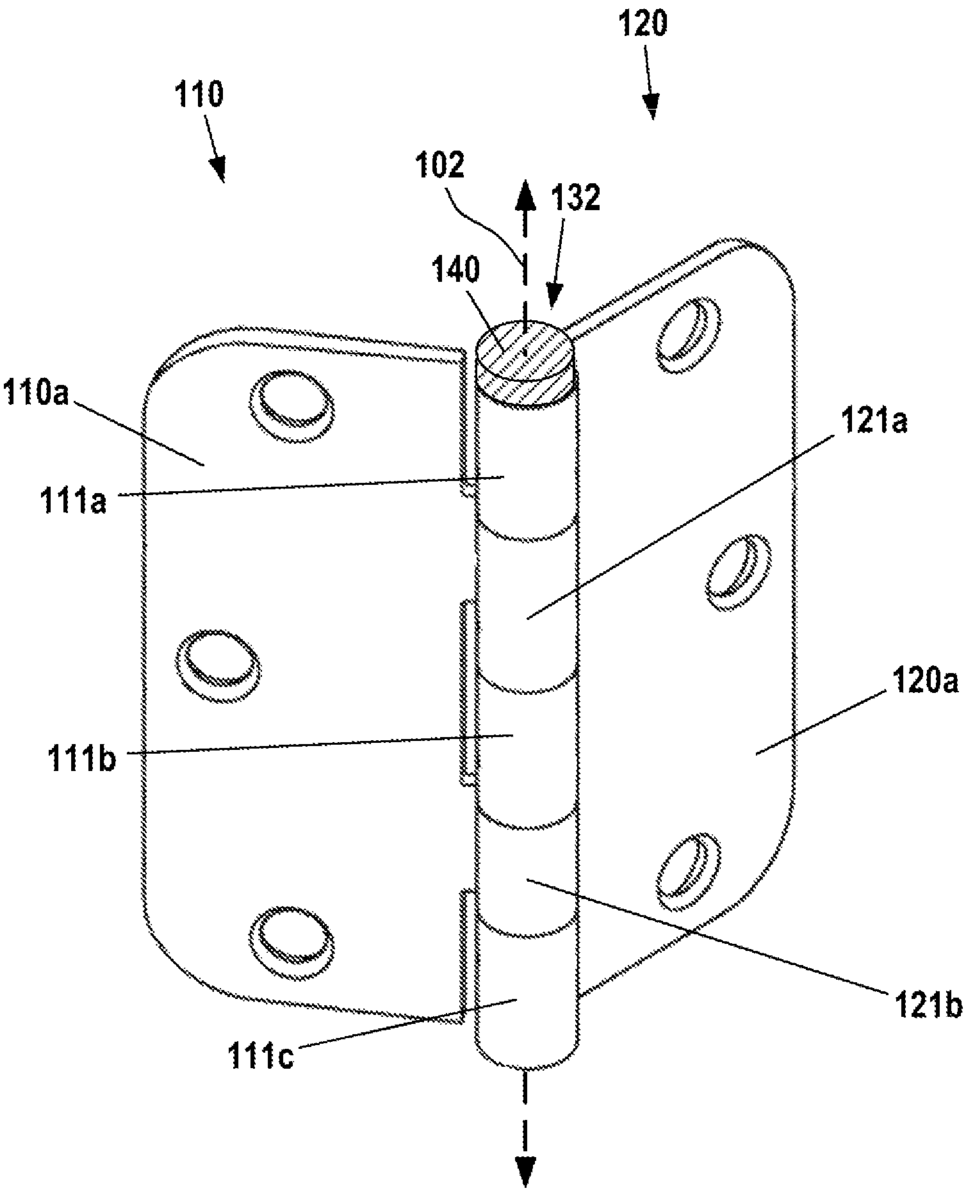

Further, in various embodiments, an exemplary hinge assembly 100 may comprise a door safety characteristic indicator 140 provided on a visible external surface of the hinge pin 130. For example, in various embodiments, a hinge assembly 100 may comprise a door safety characteristic indicator 140 provided at one or more of a top pin head surface and a pin head sidewall surface defined by the pin head 132 of the hinge pin 130. In particular, as illustrated in FIGS. 4A and 4B, the safety characteristic indicator 140 of an exemplary hinge assembly 100 may be provided at the pin head 132, such as, for example, at both the top pin head surface and the pin head sidewall surface defined by the pin head 132.

Referring back to the exemplary safety characteristic indication system 10 illustrated in FIG. 1, in various embodiments, a safety characteristic indication system 10 may comprise a plurality of hinge assemblies 100. For example, the plurality of hinge assemblies 100 may define any number of hinge assemblies that may operably stabilize the door 11 in a pivoted arrangement relative to the door frame 12*a* defined by the wall portion 12, such as, for example, at least two hinge assemblies. As a non-limiting example illustrated in the exemplary safety characteristic indication system shown in FIG. 1, the plurality of hinge assemblies 100 may comprise three hinge assemblies distributed along the same side edge of the door 11, including a first hinge assembly 100*a*, a second hinge assembly 100*b*, and a third hinge assembly 100*c*. In various embodiments, one or more of the hinge assemblies 100*a*, 100*b*, 100*c*, of the plurality 100 may comprise one or more door safety characteristic indicator for promoting identification of the door 11 as being suitable for selective use as a safety device (e.g., identification of a safety characteristic corresponding to the door 11), as described herein. For example, in various embodiments, as illustrated in FIG. 1, each of the plurality of hinge assemblies 100 (e.g., each of the first hinge assembly 100*a*, the second hinge assembly 100*b*, and the third hinge assembly 100*c*) may comprise a respective one or more door safety characteristic indicator for promoting identification of the door 11 as being suitable for selective use as a safety device.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A safety characteristic indication system for a door assembly, the safety characteristic indication system comprising:

a first door defining a safety characteristic corresponding to a first door density defined by the first door, wherein the first door is suitable for selective use as a flotation device for a person based at least in part on the first door density being below a door density flotation threshold configured in accordance with maintaining a floating condition on water while supporting a weight of the person;

a first door hinge assembly configured for securing the first door in an installed configuration relative to a first wall portion within an environment, the first door hinge assembly being configured for promoting identification of the safety characteristic corresponding to the first door, the first door hinge assembly comprising:

a first hinge plate configured for coupling with the first door;

a second hinge plate configured for coupling with the first wall portion;

a hinge pin disposed within a central hinge sleeve defined by an interlocking configuration of one or more first knuckles defined by the first hinge plate and one or more second knuckles defined by the second hinge plate; and one or more door safety characteristic indicators provided at one or more surfaces of the first door hinge assembly, the one or more door safety characteristic indicators being configured to provide a perceivable indication of the safety characteristic corresponding to the first door;

wherein the one or more door safety characteristic indicators comprises a first plurality of door safety characteristic indicators provided at the one or more first knuckles and a second plurality of door safety characteristic indicators provided at the one or more second knuckles;

a second door defining a second safety characteristic corresponding to a second door density defined by the second door, wherein the second door is not suitable as a flotation device for the person based at least in part on the second door density being above the door density flotation threshold pursuant to maintaining the floating condition on water while supporting the weight of the person; and a second door hinge assembly configured for securing the second door in an installed configuration relative to a second wall portion within the environment, the second door hinge assembly consisting of:

a third hinge plate configured for coupling with the second door;

a fourth hinge plate configured for coupling with the second wall portion; and a second hinge pin disposed within a second central hinge sleeve defined by an interlocking configuration of one or more third knuckles defined by the third hinge plate and one or more fourth knuckles defined by the fourth hinge plate;

wherein the second door hinge assembly does not include a door safety characteristic indicator provided at a surface of the second door hinge assembly.

2. The safety characteristic indication system of claim 1, wherein the one or more door safety characteristic indicator defines a visual indicator that promotes an identification of the first door as being suitable for use as the flotation device.

3. The safety characteristic indication system of claim 2, wherein the first door is suitable for selective use as the flotation device is based at least in part on one or more safety characteristics corresponding to the door.

4. The safety characteristic indication system of claim 1, wherein the one or more door safety characteristic indicators comprises a highly visible material element attached to the one or more surfaces of the first door hinge assembly.

5. The safety characteristic indication system of claim 4, wherein at least a portion of the highly visible material element is a reflective material.

6. The safety characteristic indication system of claim 5, wherein the reflective material is one of reflective lattice material or high-brightness reflective fabric.

7. The safety characteristic indication system of claim 4, wherein at least a portion of the highly visible material element is an electroluminescent tape.

8. The safety characteristic indication system of claim 1, wherein the one or more door safety characteristic indicators comprises a highly visible coating applied to the one or more surfaces of the first door hinge assembly.

9. The safety characteristic indication system of claim 8, wherein at least a portion of the highly visible coating is a reflective material.

10. The safety characteristic indication system of claim 9, wherein the reflective material is one of reflective lattice material or high-brightness reflective fabric.

11. The safety characteristic indication system of claim 1, wherein the one or more door safety characteristic indicators comprises a first door safety characteristic indicator provided at the first hinge plate and a second door safety characteristic indicator provided at the second hinge plate.

12. The safety characteristic indication system of claim 11, wherein at least a portion of the one or more door safety characteristic indicators is a reflective material.

13. The safety characteristic indication system of claim 12, wherein the reflective material is one of reflective lattice material or high-brightness reflective fabric.

14. The safety characteristic indication system of claim 11, wherein at least a portion of the one or more door safety characteristic indicators is an electroluminescent tape.

* * * * *